United States Patent
Katoot et al.

(10) Patent No.: US 6,365,072 B1
(45) Date of Patent: Apr. 2, 2002

(54) POLYMER OPTICAL FIBERS AND PROCESS FOR MANUFACTURING THEREOF

(75) Inventors: Mohammad W. Katoot, deceased, late of Roswell, GA (US), by Karen Robbyn Goodan Katoot, administrator; by Ali Maroof Katoot, administrator, Cedar Rapids, IA (US); by Ahmed Maroof Katoot, administrator, Lawrenceville, GA (US)

(73) Assignee: MK Industries, Inc., Tucker, GA (US)

( * ) Notice: Subject to any disclaimer, the term of this patent is extended or adjusted under 35 U.S.C. 154(b) by 0 days.

(21) Appl. No.: 09/273,070

(22) Filed: Mar. 19, 1999

(51) Int. Cl.[7] ............................................... B29D 11/00
(52) U.S. Cl. ..................................... 264/1.24; 264/1.29
(58) Field of Search .................................. 385/124, 143, 385/145; 264/1.1, 2.1, 1.24, 1.29, 40.6

(56) References Cited

U.S. PATENT DOCUMENTS

| | | | |
|---|---|---|---|
| 2,569,481 A | 10/1951 | Lorand et al. | 260/86.7 |
| 3,248,180 A | 4/1966 | Kilpatrick | 422/137 |
| 3,443,909 A | 5/1969 | Goossens | 422/137 |
| 3,484,213 A | 12/1969 | Dew et al. | 422/137 |
| 3,528,782 A | 9/1970 | Riggert et al. | 422/136 |
| 3,544,522 A | 12/1970 | Hahn | 422/136 |
| 4,021,600 A | 5/1977 | Anolick et al. | 528/484 |
| 4,210,567 A | 7/1980 | Kosters | 260/31.8 |
| 4,422,963 A | 12/1983 | Thompson et al. | 252/583 |
| 4,505,543 A | 3/1985 | Ueba et al. | 350/96.34 |
| 4,571,313 A | 2/1986 | Allemand et al. | 264/1.5 |
| 4,687,294 A | 8/1987 | Angeles | 350/96.23 |
| 4,734,263 A | 3/1988 | Gerking et al. | 422/135 |
| 4,842,369 A | 6/1989 | Teshima et al. | 350/96.34 |
| 4,889,408 A | 12/1989 | Teshima et al. | 350/96.34 |

(List continued on next page.)

FOREIGN PATENT DOCUMENTS

| | | |
|---|---|---|
| JP | 2-18007 | 1/1990 |
| JP | 11-095044 | 4/1994 |
| RU | 588685 | 9/1980 |

OTHER PUBLICATIONS

Darraud, C. et al., "Refractive–Index Modifications of Some Polymeric Materials by Ion Beams", *Applied Optics*, vol. 33, No. 16, pp. 3338–3341 (1994).

Fessenden, R.J., "Free–Radical Initiators and Inhibitors", *Organic Chemistry*, Section 6.7, pp. 235–236 (1982.

Ishigure, T. et al., "Graded–Index Polymer Optical Fiber for High–Speed Data Communication", *Applied Optics*, vol. 33, No. 19, pp. 4261–4266 (1994).

Koike, Y., "Graded Index Materials and Components", *Keio University*, pp. 71–104.

Koike, Y., "Spherical Gradient–Index Polymer Lens with Low Spherical Aberration", *Applied Optics*, vol. 33, No. 16, pp. 3394–3400 (1994).

Lewotsky, K., "Fiberoptics Industry Report", *Laser Focus World*, p. 51 (1995).

Sandler et al., "Polymer Synthesis", *Academic Press*, Second Edition, vol. 1, pp. 5–12 (1992).

White, V. et al., "A New Method for Producing Graded Index PMMA Waveguides", *IEEE Photonics Technology Letter*, vol. 7, No. 7, pp. 772–773 (1995).

(List continued on next page.)

*Primary Examiner*—Mathieu D. Vargot
(74) *Attorney, Agent, or Firm*—Kilpatrick Stockton, LLP

(57) ABSTRACT

The present invention describes improved methods of making polymer optical fiber cable, graded index optical fibers and step index optical fibers. The present invention may also include improved polymer optical fibers that incorporate optional quinine and quinone based compositions that shift the wavelength of radiation from ultraviolet radiation to visible radiation.

30 Claims, 3 Drawing Sheets

U.S. PATENT DOCUMENTS

| | | | |
|---|---|---|---|
| 4,891,075 A | 1/1990 | Dakubu | 136/257 |
| 4,893,897 A | 1/1990 | Parker et al. | 350/96.34 |
| 4,919,513 A | 4/1990 | Nakakuki et al. | 350/96.33 |
| 4,989,947 A | 2/1991 | Sasaki et al. | 350/96.34 |
| RE33,755 E | 11/1991 | Downey et al. | 524/296 |
| 5,145,255 A | 9/1992 | Shimada et al. | 366/329 |
| 5,217,516 A | 6/1993 | Ishiguro et al. | 65/3.11 |
| 5,217,518 A | 6/1993 | Petisce | 65/10.1 |
| 5,223,593 A * | 6/1993 | McAllister et al. | |
| 5,225,166 A | 7/1993 | Zarian et al. | 422/109 |
| 5,235,660 A | 8/1993 | Perry et al. | 385/124 |
| 5,245,057 A | 9/1993 | Shirtum | 549/517 |
| 5,278,213 A | 1/1994 | Han et al. | 524/233 |
| 5,286,457 A | 2/1994 | Woodson et al. | 422/135 |
| 5,287,222 A | 2/1994 | Uozu et al. | 359/654 |
| 5,301,254 A * | 4/1994 | Blickle et al. | |
| 5,308,986 A | 5/1994 | Walker | 250/370.11 |
| 5,312,471 A | 5/1994 | Jung | 65/18.2 |
| 5,390,274 A | 2/1995 | Toyoda et al. | 385/124 |
| 5,443,775 A | 8/1995 | Brannon | 264/143 |
| 5,466,535 A | 11/1995 | Higgins et al. | 428/483 |
| 5,470,539 A | 11/1995 | Imamura et al. | 422/136 |
| 5,476,638 A | 12/1995 | Sulzbach | 422/133 |
| 5,519,226 A | 5/1996 | Copeland et al. | 250/390.11 |
| 5,599,507 A | 2/1997 | Shaw et al. | 422/135 |
| 5,607,648 A | 3/1997 | Carter et al. | 422/137 |
| 5,644,670 A | 7/1997 | Fukuda et al. | 385/124 |
| 5,747,610 A | 5/1998 | Katoot | 526/73 |

OTHER PUBLICATIONS

Optical Interconnect Components See Dramatic Growth, *Fiberoptic Product News*, vol. 7, (1995).

Gradient Index Microlenses, *Optics Opto–Mechanics*, Opto Sigma® pp. 78–82 (1995).

International Search Report from the International Searching Authority, dated Jun. 16, 1998; International Application No. PCT/US97/19995; Filing date—Oct. 29, 1997; pp. 1–4.

Written Opinion from the International Bureau of WIPO, dated Aug. 25, 1997; International application No. PCT/US96/14786; Filing date —Sep. 13, 1996; pp. 1–9.

* cited by examiner

POLYMER OPTICAL FIBERS AND PROCESS FOR MANUFACTURING THEREOF

TECHNICAL FIELD

The present invention relates to an improved polymer optical fiber and a process and apparatus for making the improved polymer optical fiber. The invention includes a graded index polymer optical fiber and a process for the manufacture of a graded index polymer optical fiber. The invention also includes an optical fiber or polymer that is capable of shifting the wavelength of the incoming electromagnetic radiation to another wavelength. The present invention includes a method for chemical cleansing of radicals to produce high transparency polymers and a method by which polymer fibers can be made radiation hardened. The present invention includes a method to achieve very rapid polymerization of known monomers. The present invention also includes a method by which a rapid fast cast of polymers is achieved using microwaves and the resulting preform rods can be drawn without the need for degassing.

BACKGROUND OF THE INVENTION

Plastic or polymer optical fibers have been produced in the prior art over the past several decades. However, the prior art methods of producing the optical fibers have produced fibers that are relatively inefficient with regard to transmission efficiencies, especially when compared to glass optical fibers.

For example, for long-range optical communication a single-mode glass optical fiber has been widely used, because of its high transparency and high bandwidth. In contrast, for short-range communication, recently there has been considerable interest in the development of polymer optical fibers. In short-range communications (such as local area network systems, interconnections, the termination area of fiber to the home, and domestic passive optical network concepts), many junctions and connections of two optical fibers are necessary. In a single-mode fiber, the core diameter is approximately 5–10 micrometers ($\mu$m), so when one connects two fibers, a slight amount of displacement, such as a few micrometers, causes a significant coupling loss. The polymer optical fiber is one of the promising possible solutions to this problem, because commercially available polymer optical fiber usually has a large diameter such as 1 mm. Therefore, low transmission loss and high bandwidth has been required for polymer optical fibers to be used as a short-distance communication media.

Most commercially available polymer optical fibers, however, have been of the step-index type. Therefore, even in short-range optical communication, the step-index polymer optical fibers will not be able to cover the whole bandwidth of the order of hundreds of megahertz (MHz) that will be necessary in fast datalink or local area network systems in the near future, because the bandwidth of the step-index polymer optical fibers is only approximately 5 MHz/km.

In contrast, graded-index polymer optical fiber is expected to have a much higher bandwidth than step-index polymer optical fibers, while maintaining a large diameter. Several reports of a graded-index polymer optical fiber have been made by Koike and collaborators (e.g., Ishigure, T., et al., "Graded-index polymer optical fiber for high-speed data communication" *Applied Optics* Vol. 33, No. 19, pg. 4261–4266 (1994)). However, the methods described in this paper by Ishigure et al., are gel diffusion methods of producing graded index fibers and are cumbersome and expensive.

Traditional methods for making fiber optic polymers include producing fibers either by extrusion or by producing an extrudable preform rod to be drawn in a high temperature oven. In both methods, polymerization processes last for approximately 48 to 72 hours after which polymers are degassed for about 48 to 72 hours to ensure no monomer residuals or other solvents. The entire process may take from 4 to 6 days or longer, thereby hampering large scale production and increasing the possibility of introducing impurities which reduce optical transmission.

What is needed is a low cost and simple method of rapidly producing a graded index polymer optical fiber. What is needed is a method for rapidly producing preform rods with few impurities that does not require a degassing step. The method should produce a low-loss and high-bandwidth graded index polymer optical fiber and should include control of the graded refractive index and flexibility of the fiber. The fiber produced by this method should be flexible. In addition, the method should be easily adaptable to current manufacturing techniques of extruding polymer optical fiber.

SUMMARY OF THE INVENTION

The present invention provides for a low-loss and high-bandwidth optical fiber cable that is flexible, rapid, inexpensive, and simple to produce. The present invention also includes methods for producing a graded index preform rod that can be used to make graded index optical fiber cable that is highly flexible. The present invention also provides a method for producing these fibers more quickly and economically than current methods.

For graded index optical fiber cable, the method of the present invention includes beginning with a cylinder of a homogeneous cladding polymer. The cylinder of cladding is inserted into a reaction chamber that is capable of being heated and rotated along its longitudinal axis. For example, the cladding can be a preformed silicone oligomer i.e., $\alpha,\omega$, dichloropropyldimethylsiloxane which has a refractive index of 1.42. Alternatively, microwave radiation may be employed with particular prepolymer compositions to make the preform rod.

A monomer mixture of, for example, the above cladding and excess bisphenyl A polycarbonate with bisphenyl A pyridine methylene chloride solution is then added to the interior of the cladding either continuously or stepwise as the chamber is heated and rotated. Phosgene gas is also added continuously to the chamber as the preform rod is formed. As the copolymer polymerizes on the inner surface of the cladding the proportion of bisphenyl A polycarbonate to dimethylsiloxane can be varied to provide a copolymer with gradually changing refractive index. As the copolymer builds up on the inner surface of the cladding, the amount of polydimethylsiloxane decreases and the amount of bisphenyl A polycarbonate increases until the preform rod is filled in. The preform rod can then be removed from the reaction chamber and used in a conventional extrusion apparatus to manufacture optical fiber.

Another monomer mixture that can be used in practicing the present invention is styrene, methyl methacrylate, and a monomer that polymerizes with lower surface energy polymers, such as fluorinated monomers or siloxane. While not wanting to be bound by the following hypothesis, it is believed that during polymerization, low surface energy polymers migrate outwards, and that the refractive index profile of the preform rod is controlled by the temperature conditions.

The present invention also includes a method for increasing the clarity of the polymer optical fiber by the addition of free radical scavengers such as dibutyl-1-phthalate at a concentration of approximately 0.5% by volume. Other free radical scavengers that can be added to the polymer in the process of producing the preform rod include, but are not limited to, propanol, cyclohexane and butylnitrile. Other agents that can be used to increase the clarity of the polymer optical fiber include, but are not limited to, a variety of low temperature glass transition small molecules, such as siloxane oligomers and different Lewis acids.

The resulting fibers can easily be bundled together and fused by placing the bundle in a container and applying a vacuum to the bundle. The temperature is raised to the glass transition point of the cladding. The bundle is then allowed to cool. The process is desirably repeated several times, preferably four to five times, resulting in a uniform bundle of fibers.

Finally, the present invention includes additives that can be added to any conventional optical fiber and the optical fibers of the present invention that are capable of very large wavelength shifts between the incoming and exiting radiation. Some of these additives produce wavelength shifts include shifts from ultraviolet to blue-green and blue visible radiation. These additives may be added to preform rods, films or other shapes of the optical fibers made with the methods of the present invention.

Accordingly, it is an object of the present invention to provide a graded index polymer fiber optical cable.

It is an object of the present invention to provide a low-loss and high-bandwidth graded index polymer fiber optical cable.

It is further an object of the present invention to provide a method of rapidly manufacturing a flexible, graded index polymer fiber optical cable.

It is further an object of the present invention to provide a method of manufacturing a fused bundle of graded index polymer fiber optical cable.

It is yet another object of the present invention to provide preform rods can be produced rapidly in comparison to previously known methods that require much more time.

It is yet another object of the present invention to provide preform rods and graded index preform rods that can be produced without application of vacuum or a degassing step as required by conventional methods, thereby speeding production of preform rods that are ready to be pulled into fibers.

It is yet another object of the present invention to provide preform rods and graded index preform rods using microwave radiation.

It is yet another object of the present invention to provide an optical polymer suitable for use as a film, gel or fiber optical cable, that is capable of producing large shifts in wavelength between the incoming and exiting electromagnetic radiation.

It is yet another object of the present invention to provide polymers containing the wavelength shifters that can be made in different forms and shapes, and incorporated into radiation surveillance equipment, radiation detectors, and industrial and recreational clothing.

It is another object of the present invention to provide polymer compositions containing the wavelength shifters that can be used for viewing of X-ray, ultraviolet, or infrared radiation as visible radiation. The present invention also includes the shifting of visible radiation to X-ray, ultraviolet, or infrared radiation It is another object of the present invention to provide polymer compositions containing the wavelength shifters used for viewing of X-ray, ultraviolet, and infrared radiation as visible radiation and to provide the ability to visualize previously invisible radiation in real time and at reduced levels of the incident radiation presently required for visualizing objects, thereby decreasing radiation exposure of patients and health care professionals.

Another feature of the optical polymer fibers of the present invention is that they provide the ability to magnify images with high resolution.

It is another object of the present invention to provide a polymer fiber optical cable suitable for use in endoscopic instruments.

It is another object of the present invention to provide optical fibers that are very flexible.

These and other objects, features and advantages of the present invention will become apparent after a review of the following detailed description of the disclosed embodiments.

DETAILED DESCRIPTION OF THE INVENTION

Figure 1:
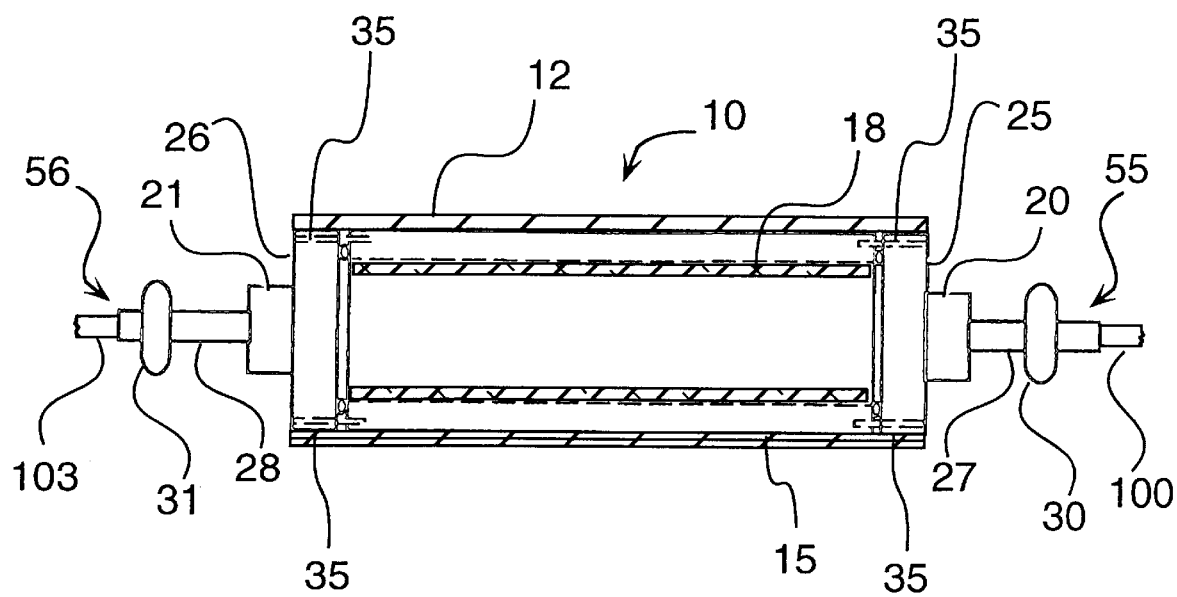
FIG. 1 is a cutaway side view of the rotating polymerization vessel.

The term "prepolymer composition" includes monomers and oligomers that can be used to make a polymer with desired physical characteristics. The term "preform rod" as used herein, means the polymer rod that is produced in the polymerization vessel according to the present invention. The term "wavelength shifting additive" as used herein, means any additive that is capable of adding the capability to a polymer of changing the wavelength of electromagnetic radiation transmitted through the polymer. The wavelength shifting additive is preferably added to the prepolymer mixture before polymerization. The term "patient", as used herein, means any human or animal. The term "health care professional", as used herein, means any person engaged in the provision of health care to a patient and includes, but is not limited to the following: physicians including radiologists, gastroenterologists, nuclear medicine physicians, and oncologists; nurses including nuclear medicine nurses; technicians including radiological technicians, gastroenterology technicians, neurological technicians; veterinarians and their assistants; dentists, dental assistants; and speech pathologists. The term "research professional", as used herein, means any person engaged in research who may be exposed to radiation including, but not limited to, the following: scientists; laboratory technicians; students; and postdoctoral fellows.

The term "relative percentage" indicates the amount of one ingredient divided by the amount of another ingredient times 100. Accordingly, if substance X were present at twice the concentration of substance Y, the relative percentage of X to Y would be 200% expressed as relative percentage of X to Y=(X/Y) times 100.

The present invention provides for a low-loss and high-bandwidth graded index optical fiber cable that is inexpensive and simple to produce. The present invention also includes a method of producing the graded index optical fiber cable that is rapid. The method of the present invention produces a fiber that is extremely flexible. The present invention provides a method for producing an optical fiber of desired flexibility.

The present invention can be used to produce graded index optical fiber cable from a variety of monomers including, but not limited to, the monomers listed in Table I. The refractive index is indicated as $n_D$.

TABLE I

| Monomer | $n_D$ of polymer |
| --- | --- |
| methyl methacrylate | 1.49 |
| ethyl methacrylate | 1.483 |
| n-propyl methacrylate | 1.484 |
| n-butyl methacrylate | 1.483 |
| n-hexyl methacrylate | 1.481 |
| isopropyl methacrylate | 1.473 |
| isobutyl methacrylate | 1.477 |
| tert-butyl methacrylate | 1.463 |
| cyclohexyl methacrylate | 1.507 |
| benzyl methacrylate | 1.568 |
| phenyl methacrylate | 1.57 |
| 1-phenylethyl methacrylate | 1.549 |
| 2-phenylethyl methacrylate | 1.559 |
| furfuryl methacrylate | 1.538 |
| methyl acrylate | 1.4725 |
| ethyl acrylate | 1.4685 |
| n-butyl acrylate | 1.4634 |
| benzyl acrylate | 1.5584 |
| 2-chloroethyl acrylate | 1.52 |
| vinyl acetate | 1.47 |
| vinyl benzoate | 1.578 |
| vinyl phenylacetate | 1.567 |
| vinyl chloroacetate | 1.512 |
| acrylonitrile | 1.52 |
| a-methylacrylonitrile | 1.52 |
| methyl- a -chloroacrylate | 1.5172 |
| atropic acid, methyl ester | 1.560 |
| o-chlorostyrene | 1.6098 |
| p-fluorostyrene | 1.566 |
| o, p-difluorostyrene | 1.475 |
| pentabromophenylacrylate | 1.7 |
| pentachlorophenyl methacrylate | 1.63 |
| pentabromophenlmethacrylate | 1.71 |
| chlorophenylacrylate | 1.5 |
| benzylmethacrylate | 1.56 |
| 2,4,6 tribromophenylacrylate | 1.6 |
| α, ω, dichloropropyl-dimethylsiloxane | 1.42 |
| p-isopropyl styrene | 1.554 |
| 2,2,2-trifluoroethylacrylate | 1.37 |
| 2,2,2-trifluoroethylmethacrylate | 1.39 |
| tribromoneopentylmethacrylate | 1.6 |

The following monomers are among those monomers that are useful as cladding for the polymer fiber optical cable of the present invention.

| 1H, 1H pentadecafluorooctylacrylate | 1.33 |
| --- | --- |
| 1H, 1H pentadecafluorooctylmethacrylate | 1.35 |
| 1H, 1H, 4H hexafluorobutylmethacrylate | 1.39 |
| 1H, 1H, 4H hexafluorobutylacrylate | 1.39 |
| 1H, 1H, 2H, 2H heptadecafluorodecylacrylate | 1.35 |
| 1H, 1H, 2H, 2H heptadecafluorodecylmethacrylate | 1.35 |

-continued

| hexafluoro-iso-propylacrylate | 1.40 |
| --- | --- |
| hexafluoro-iso-propylmethacrylate | 1.40 |
| 1H, 1H heptafluorobutylmethacrylate | 1.37 |
| 1H, 1H octafluoropentamethacrylate | 1.39 |
| 1H, 1H heptafluorobutylacrylate | 1.39 |

Prepolymer compositions which are useful in the practice of the present invention, include such polymers as polycarbonates (such as those sold by General Electric Company, Schenectady, N.Y., under the trademark LEXAN™, polyesters, polyolefins, acrylic polymers (such as those sold by Cyro Industries under the trademark ACRYLITE™) and other thermoplastic polymers. Another example of a suitable acrylic polymer is polymethyl methacrylate. Other polymers which may be used in the present invention include, but are not limited to, halide-terminated organosiloxanes such as chlorine-, bromine-, and fluorine-terminated organosiloxanes, alkoxyfunctional siloxanes with an alcoholic split (i.e., an OH side group), hydroxy terminated polymer borates, dihydric phenol with readily removable ammnonia groups, and diphenol propane bischloroformate.

The present invention is especially useful for producing graded index polymer optical fibers with specialized, non-linear graded index cross-sections. Additives can be incorporated into the graded index polymer optical fibers of the present invention to provide useful effects. For example, wavelength shifters can be added to shift wavelengths of electromagnetic radiation transmitted through the fiber. By choosing the proper polymers, the flexibility of the graded index polymer optical fibers can be adapted to a particular use. For example, in the present invention, the relative percentage of methylmethacrylate to styrene may be varied from 10% to 400% to change the flexibility and refractive index of the polymer fiber. When the relative percentage of methylmethacrylate to styrene is about 50%, the resulting fibers exhibit great flexibility.

The present invention is also useful in producing single mode optical fibers that can be used for visual transmission of images. These fibers are particularly useful for endoscopic devices. By using the fibers according to the present invention, the optical fibers can replace expensive glass fibers with little or no reduction in the clarity of the transmitted image.

For example, the process of adding the copolymer is adjusted so that the final polymer added is bis phenyl A polycarbonate or other phenols listed in Table 1 which have a refractive index of less than or equal to 1.58. The resulting preform rod is a graded index rod with an index of 1.42 on the surface which gradually increases to 1.58 at the center of the preform rod. The rod can then be heat-drawn using conventional extrusion techniques to provide a graded index polymer optical fiber. It is important to note that, according to the present invention, the change in refractive index from the outer surface of the preform rod, and therefore the resulting optical fiber, can be linear, non-linear, or even stepped, depending upon the manner in which the polymers are added to the cylinder. To produce a single mode optical fiber, a single concentration of a polymer or mixture of polymers is used in the synthesis of the preform rod. To produce a graded index optical fiber, two or more polymers are used.

In one embodiment, the present invention includes the rapid formation of flexible optical fibers as set forth in Examples 1 through 4. The various monomers are mixed together and then heated. By adjusting the ratio of methylmethacrylate to styrene, the flexibility of the fiber can be adjusted. Also, by employing N,N-dimethylaniline and tetrabutyl ammonium fluoride tetrahydrate (TAFT) which is in methanol, higher molecular weight polymers may be formed as shown in Example 2. Using TAFT in methylmethacrylate and N,N-dimethylaniline as described in Example 3 produces fibers with increased flexibility, and higher molecular weight polymers that are formed more rapidly than the fibers formed by the process of Example 1. It is believed that the N,N-dimethylaniline and TAFT speed polymerization and increase the molecular weights of the resulting polymers in the fibers. It is to be understood that some of the chemicals recited in these Examples may be changed in the practice of the present invention. In Example 4, for instance, it is also possible to use mercurate chloride and mercuric oxide instead of mercuric-2-chloride in the practice of this method of the present invention. The temperature conditions recited in Examples 1 through 4 may also be modified in the practice of the present invention.

Briefly, one embodiment of the present invention includes the formation of a graded index polymer on the inside surface of a tube of cladding polymer. The refractive index of the cladding polymer is a sufficiently lower than that of the core polymer, and is desirably less than 1.43, and preferably less than 1.415. As the refractive index decreases, the maximum possible light incident angle increases. Additional properties necessary for the cladding polymer are high transparency, mechanical strength, heat resistance and adhesiveness to the core. In the graded index fiber, the cladding may be the copolymer itself.

The refractive index gradient is formed by using two or more different monomers or oligomers and reacting those monomers or oligomers while varying the ratio of the concentration of the monomers or oligomers as the preformed rod is being formed. In this way, a smooth gradient is formed from the inner surface of the cladding to the center of the preformed rod. The preformed rod can then be heat drawn to form the fiber. In the present invention, the relative percentage of methylmethacrylate to styrene may be changed depending on the desired refractive index. Furthermore, as described in Example 5, the amount of 2,2,2-trifluoroethyl methacrylate or 2,2,2-trifluoroethyl acrylate which is added may vary between approximately 1 wt % and 20 wt % depending on the desired profile of refractive index of the fiber. In addition, the rate of temperature increase described in Example 5 may be altered to affect the graded index characteristics of the fiber.

The monomers and all of the required reactants should preferably be cleaned by the use of, for example, ultrafilters capable of removing fine particles having sizes of 100 Å or more. Monomers are cleaned in two consecutive processes: first, monomers are washed with appropriate solvents (such as water) and then dried with anhydrous or nonaqueous solvents. Then, the monomers can optionally be vacuum distilled before introduction into the polymerization chamber.

Turning now to the figures in which like numbers represent like elements in each of the figures, in FIG. 1 is shown a cross-sectional view of the polymerization vessel 10 with a heating jacket 12 surrounding the polymerization vessel 10. The heating jacket 12 can be any commercially available heating jacket, preferably heated by electricity. The polymerization vessel 10 is preferably a stainless steel cylinder 15 with a right end cap 25 and a left end cap 26. Each of the caps 25 and 26 has a threaded hex knot (shaft support) 20 and 21 respectively. Shafts 27 and 28 are inserted into caps 25 and 26 respectively. The right end cap 25 and the left end cap 26 each have a bearing and slip ring 30 and 31. The right end cap 25 and the left end cap 26 are attached to the stainless steel cylinder 15 by seal screws for end caps 25 and 26. In operation, an outer polymer cladding and polymer growth substrate 18 is inserted into the polymerization vessel 10 before polymerization of polymer.

Figure 2:
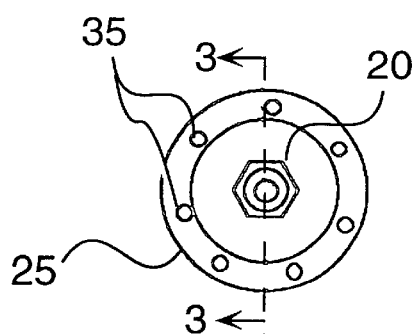
FIG. 2 is an end view of the polymerization vessel.
Figure 6:
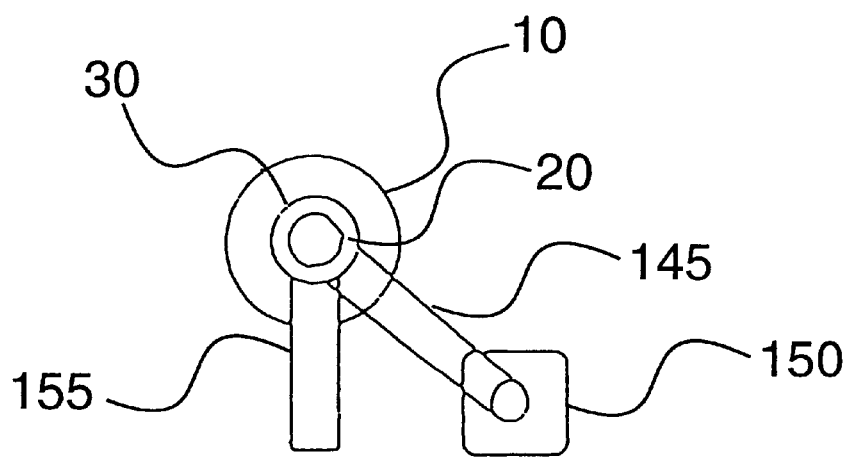
FIG. 6 is an end view of the polymerization vessel attached to a variable speed motor.

FIG. 2 shows an end view of polymerization vessel 10 showing slip ring 30 and shaft support 20. Also shown are the seal screws for the end caps 35. As shown in FIG. 6, the polymerization vessel 10 on support 155 can be rotated during the polymerization process by attaching a belt 145 to shaft 28 between threaded hex nut 20 and slip ring 30 and to a variable speed motor 150.

Figure 3:
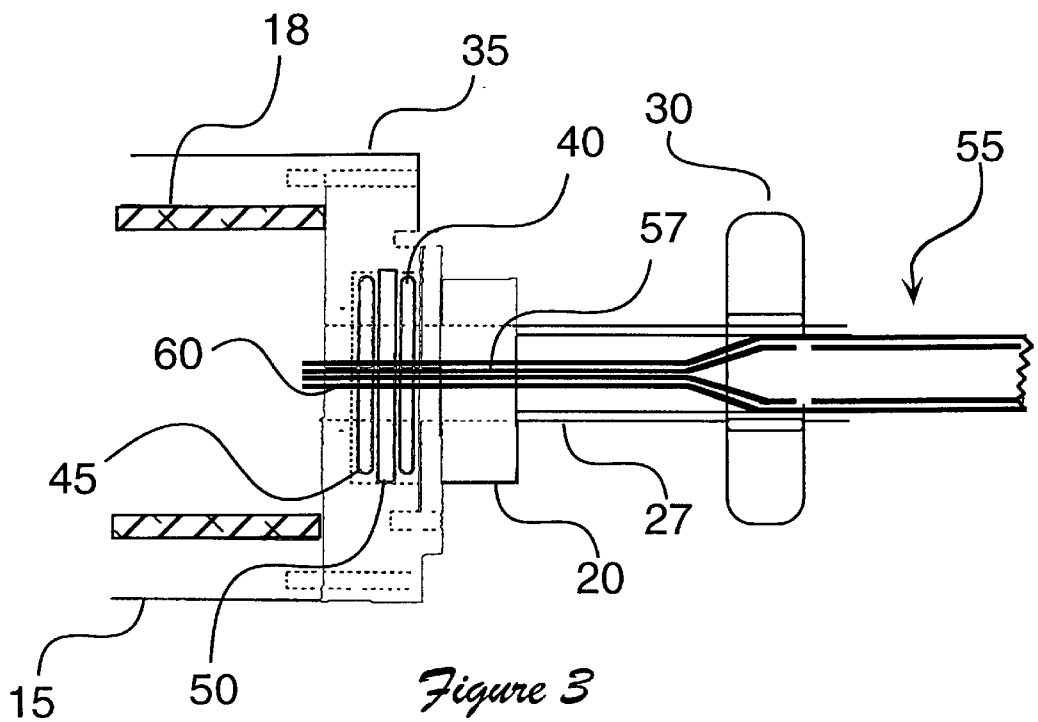
FIG. 3 is a cut-away view along line 3—3 of one end of the rotating polymerization vessel showing injection of reactants into the container.

FIG. 3 shows a cutaway view of the right end cap 25 at of the polymerization vessel 10 cut along lines 3—3. FIG. 3 also shows right injection system 55 inserted into shaft 27 and shows bearing and slip ring 30, shaft 27, and right end cap 25. Also shown in recess 60 is a sealing disk for injection system 40 and 45 on either side of cylindrical spacer 50. The injection and outlet system 55 is inserted into shaft 27 with needle 57 inserted through ceiling disk 40 and 45 and cylindrical spacer 50 through which prepolymer is injected into the polymerization vessel 10.

Figure 4:
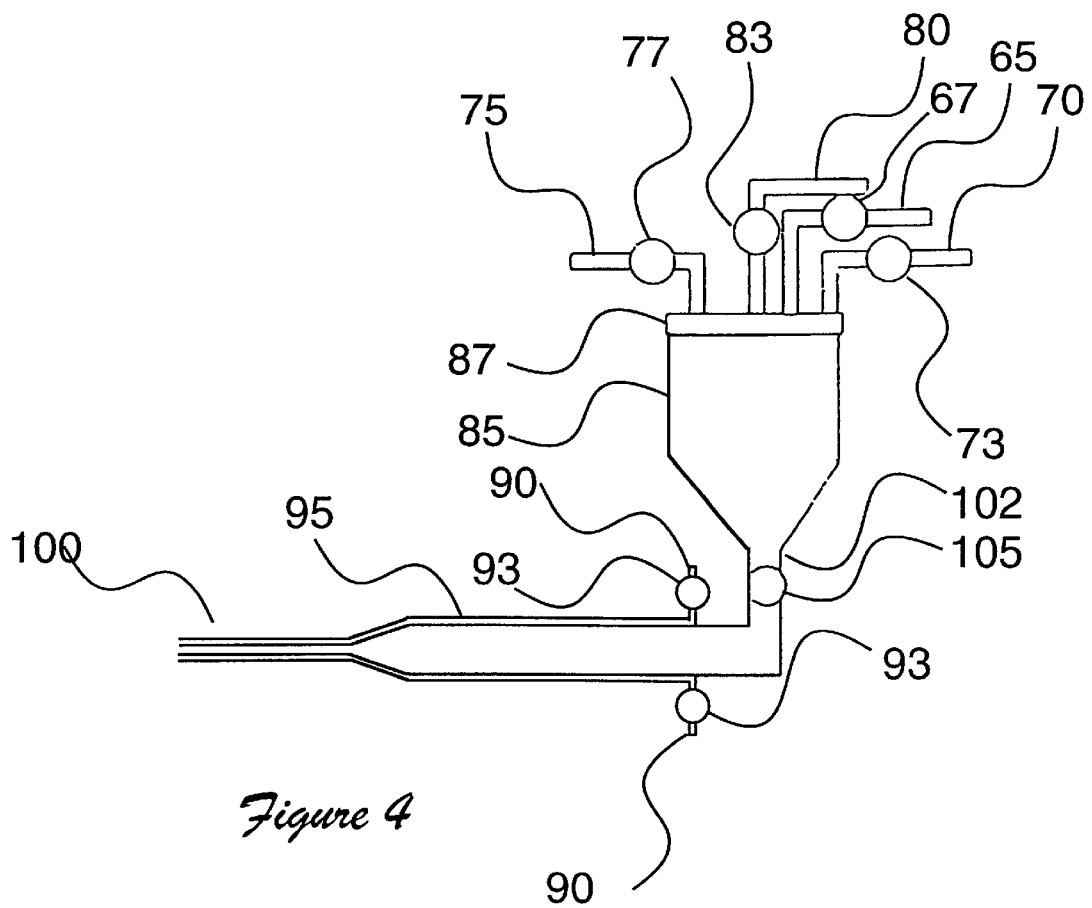
FIG. 4 is a schematic showing the injection and outlet system.

Turning now to FIG. 4 which shows the right injection and outlet system 55 in its entirety. The injection and outlet system 55 is comprised of a mixing vessel 85 with a sealed cap 87. Multiple inlet ports are inserted into sealed cap 87. In the embodiment shown in FIG. 4, there is an input to vacuum 65 with an input to vacuum valve 67. There is a first input port 70 with a first input valve 73. There is also a second input port 75 with second input valve 77. It is to be understood that in the present invention more than one input port can be inserted into the mixing vessel 85 depending on how many prepolymer compositions are to be introduced into the polymerization vessel 10. The mixing vessel 85 also has an input port from a distillation apparatus 80 and an input port valve from the distillation apparatus 83. In use, the distillation apparatus 80 may or may not be used. In addition, more than one distillation apparatus 80 may be attached to the mixing vessel 85. The mixing vessel 85 has a mixing vessel port 102 which opens to injection container 95 through mixing vessel port valve 105. The injection container opens to first injection port 100 which is inserted into shaft 27 or left shaft 28 during loading of the rotating polymerization 10. The injection container has two outlet ports 90 and two outlet port valves 93. These outlet ports are used to remove gases from the polymerization vessel 10 as the polymerization vessel is loaded.

Figure 5:
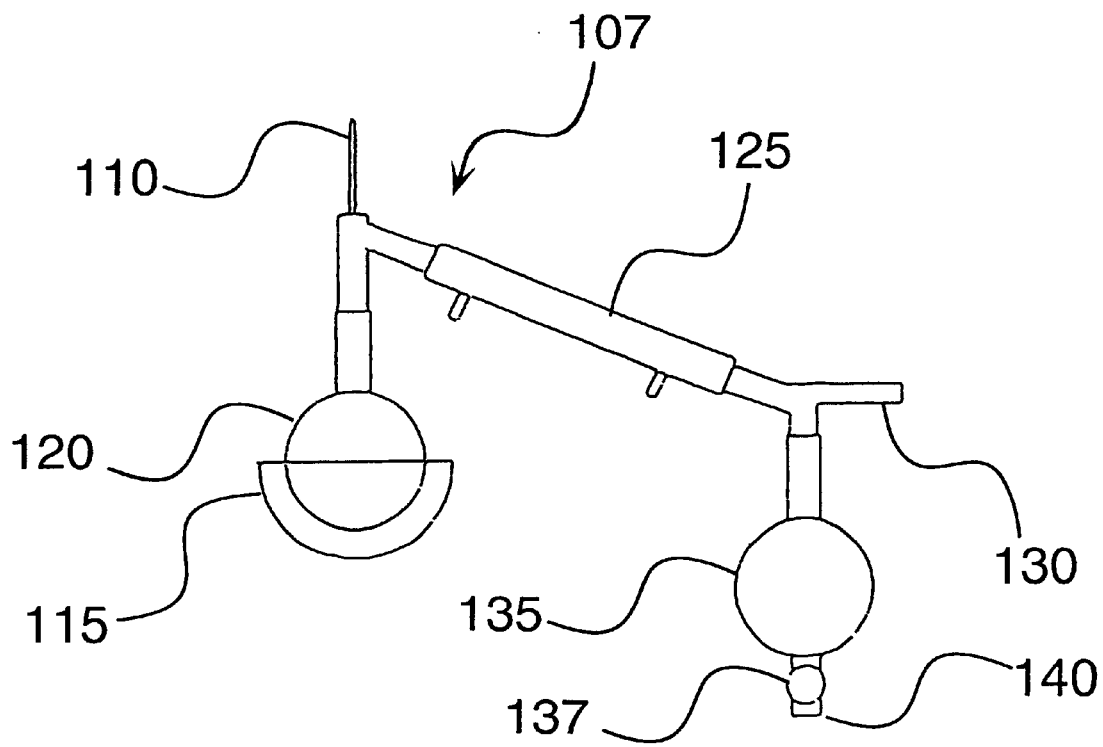
FIG. 5 is a schematic of the distillation system.

The distillation apparatus 107 is shown in FIG. 5 and comprises a distillation flask 120 that is set in heater 115. Distillation flask 120 has a thermometer 110 inserted in the top of the distillation flask 120. The distillation flask 120 is attached to a condenser 125 which is capable of being cooled either by water or other cooling fluid. The condenser 125 is connected to receiving flask 135 through a connector which has an outlet to vacuum 130. The receiving flask 135 has a port 140 to mixing vessel 85. The port 140 to mixing flask has a receiving flask valve 137 to control delivery of material to mixing vessel 85.

In preparing a preform rod, the outer polymer cladding and polymer growth substrate 18 is placed in the polymerization vessel 10 and the end caps 25 and 26 are attached to the polymerization vessel and sealed. The polymerization vessel 10 is heated to the desired temperature by heater 12. As shown in FIG. 6, the polymerization vessel 10 is rotated by turning on motor 150 to the desired speed.

The prepolymer compounds are then mixed in mixing vessel 85 by introducing the various prepolymer compounds via the input ports 70, 75, and 80 to the mixing vessel 85. Once the prepolymer compounds are delivered to the mixing vessel 85, they can be injected directly into the polymerization vessel 10 via the injection system 55. The polymerization vessel 10 is then heated to the desired temperature and the prepolymer mixture is injected into the polymerization vessel 10 at the desired rate through the injection and outlet system 55. At the other end of the polymerization vessel 10, an initiator, such as phosgene, is added via injection. This process continues until the polymer is formed filling the polymerization vessel 10. It is to be noted that the mixture of prepolymer compounds can be added at various rates thereby changing the ratio of the prepolymer components in the final polymer as the polymer is formed in the polymerization vessel 10. In this way, a graded index preform polymer can be easily produced and the ratio of the prepolymer compounds can be varied in any way to form a preformed polymer with the desired index changes from the cladding to the center of the preformed polymer.

After the preformed rod is formed, the rod is removed from the polymerization vessel 10 and can be extruded by means well known to those of ordinary skill in the art to form a polymer fiber.

In one embodiment of the present invention, the prepolymer compounds are mixed in a mixing vessel by introducing the various prepolymer compounds via the input ports to the mixing vessel. Once the prepolymer compounds are delivered to the mixing vessel, they can be injected directly into the polymerization vessel via an injection system. The polymerization vessel is then heated to the desired temperature and the prepolymer mixture is injected into the polymerization vessel at the desired rate through the injection and outlet system. At another inlet, preferably at the other end of the polymerization vessel, an initiator, such as phosgene, is added via injection. This process continues until the polymer is formed filling the polymerization vessel. It is to be noted that the mixture of prepolymer compounds can be added at various rates thereby changing the ratio of the prepolymer components in the final polymer as the polymer is formed in the polymerization vessel. In this way, a graded index preform polymer can be easily produced and the ratio of the prepolymer compounds can be varied in any way to form a preformed polymer with the desired index changes from the cladding to the center of the preformed polymer.

After the preformed rod is formed, the rod is removed from the polymerization vessel and can be extruded by means well known to those of ordinary skill in the art to form a polymer fiber.

In another embodiment of the present invention, the preform graded index polymer can be rapidly produced in a single step. The various monomers are mixed together and then heated. During the polymerization process, by adjusting the rate of temperature increase or decrease, the refraction index profile of the preform rod can be adjusted to any desired profile. In the embodiment described in detail in Example 5, styrene and methylmethacrylate are mixed. The relative percentage of methylmethacrylate to styrene can be between approximately 10% and 500% with a desired relative percentage of between approximately 40% and 400% with the most desired ratio of between approximately 80% and 400%.

Polymerizing promoters, such as dibenzoyl peroxide are then added. It should be noted that the refraction index profile can be determined by the ratio of monomers in the initial mix. Next, 2,2,2-trifluoroethyl methacrylate (1–20% wt %) or 2,2,2-trifluoroethyl acrylate (1–20% wt %) is added and mixed with the other reagents. The mixture is then placed in a vacuum oven under nitrogen at about 50° C. for several hours. The temperature is then gradually increased depending on the percentage of polymer desired and the profile of the desired refractive index. Desirably, the rate of temperature increase is approximately 10° C. per 30 minutes until approximately 100° C. is attained. Then the temperature is increased to approximately 130° C. for about 1 hr and the procedure is finished. Increasing the temperature rapidly will cause the refractive index change to be greatest near the surface of the preform rod. Increasing the temperature slowly will cause a more linear refractive index change. Other temperature profiles can be used in practicing the present invention depending upon the refractive index profile desired. This embodiment has the advantage of producing a graded index polymer fiber in a single reaction in a relatively short period of time. No mechanical manipulation of the reaction mixture is required.

In yet another embodiment of the present invention, it has been found that if the mixture of prepolymer compositions and initiators is exposed to microwave radiation between approximately 1 minute and 60 minutes, the amount of initiator or polymerizing promoter required can be lowered, the clarity of the resulting polymer is greatly increased and the graded index profile can be controlled more precisely. In practice, after exposing the monomer mixture to microwave radiation, the resulting partially polymerized gel can be either completely cured using microwave radiation, or, more desirably, cured using heat. The desired method of exposing the unpolymerized solutions to microwave radiation is to expose the solution to the microwave radiation for a short period of time, e.g., 30 seconds, and then cool the solution in an ice bath. The exposure/cooling procedure may be repeated until a gel is formed. The power of the microwave oven is desirably approximately 700 watts. The power of microwave radiation and the length of time one exposes the monomer mixture to microwave radiation is dictated by the desired final profile of the preform rod.

In one embodiment of the present invention, high molecular weight prepolymer compositions, such as high molecular weight forms of methylmethacrylate and polymethylmethacrylate may be used to make preform rods, including graded index preform rods. In some cases, the molecular weights of these prepolymer compositions may be 20,000, 50,000, 75,000, 1,000,000 or higher. The methods of using microwaves to form the preform rods are shown in Examples 17, 18, 19, 20, and 21. The ratios of the prepolymer compositions may be varied to achieve the desired characteristics. For example, the ratio of methylmethacrylate to polymethylmethacrylate may be 90% to 10% by weight. Initiators such as 2,2'-azobisisobutyronitrile, peroxides, benzyl peroxide, tertiary butyl peroxide and dibenzoyl peroxide can be used in the method of the present invention.

Gels may be cured using a variety of temperature conditions and durations. In one embodiment, the step of curing the gel comprises curing in an oven at a temperature of approximately 70° C. to 90° C. for about 24 hours followed by curing in an oven at a temperature of about 100° C. for at least 12 hours. In another embodiment, the step of curing the gel comprises curing in an oven at a temperature of approximately 55° C. for about 24 hours followed by curing in an oven at a temperature of about 80° C. for at about 36 hours. In yet another embodiment, the step of curing the gel comprises curing in an oven at a temperature of approximately 70° C. to 80° C. for about 12 to 24 hours followed by curing in an oven at a temperature of about 90° C. to 110°

C. for approximately 12 hours. In still another embodiment, the step of curing the gel comprises curing in an oven at a temperature of approximately 70° C. to 80° C. for about 12 to 24 hours, or curing in a chamber at a temperature of about 90° C. to 110° C. for approximately 12 hours.

The graded index polymer optical fibers of the present invention are particularly suited for short-distance communication applications such as local area networks (LANs), datalinks, and multinoded bus networks, because their easy processing and large diameters enable high efficiencies of fiber coupling and beam insertion. The graded index polymer optical fibers of the present invention have a much higher bandwidth (>500 MHz/km) than that of a multimode step index polymer optical fibers (2–5 MHz/km).

The present invention also includes a method for increasing the clarity of the polymer optical fiber by the addition of free radical scavengers such as dibutyl-1-phthalate at a concentration of approximately 0.5% by volume. Other free radical scavengers that can be added to the polymer in the process of producing the preform rod include, but are not limited to, propanol, cyclohexane and butylnitrile. Other agents that can be used to increase the clarity of the final fiber include, but are not limited to, a variety of low temperature glass transition small molecules, such as siloxane oligomers and different Lewis acids. It is to be understood that the agents that can be used to increase the clarity of the final fiber can be used alone or in any combination. Desirably, the concentration of the clarity agent should between approximately 0.01 to 2% by weight with the more desirable concentration between approximately 0.1 to 1% with the most desirable concentration of approximately 0.5% by weight.

The present invention also includes additives that are capable of shifting the wavelength of electromagnetic radiation as the radiation passes through a polymer containing the additives. The additives can be used in any polymer or polymer fiber. The additives are unique in that they are capable of producing very large shifts in radiation wavelength. For example, certain of the additives can shift the wavelength of the incoming electromagnetic radiation from the ultraviolet range to the visible range. Another of the additives can shift infrared electromagnetic radiation to visible radiation. Yet another of the additives is capable of shifting X-ray electromagnetic radiation to visible. The additives of the present invention are capable of shifting electromagnetic radiation over a wavelength range of about 200 nm. For example, the additive described in Example 6 is capable of shifting the wavelength of ultraviolet electromagnetic radiation at a wavelength of 250 nm to visible radiation observed as green light at a wavelength of approximately 420 nm.

The present invention includes compositions and methods of making these compositions that are additives capable of shifting the wavelength of radiation from ultraviolet to blue-green and blue visible radiation. These compositions are described in Examples 15 and 16 and include quinoline, quinine, and quinine monohydrochloride dihydrate based compositions. They may be added to the preform rods, including graded index preform rods of the present invention, as well as polymeric films, sheets, fibers and other objects made with the methods of the present invention.

Although not wanting to be bound by the following hypothesis, it is believed that the wavelength shift is due to an intramolecular proton shift. The additives are generally polymers that are in a "ladder" configuration with crosslinkers comprising aromatic moieties that are capable of donating and accepting protons when exposed to electromagnetic radiation. It is believed that the shift of the protons causes a shift in the wavelength of the electromagnetic radiation.

The present invention can also be applied to a film for a variety of applications involving various kinds of imaging processes, all of which are considered within the scope of the present invention. Conventional radiographic procedures involve the passage of X-rays through an object to produce an image composed of white, black and various shades of gray depending on the radiodensity of the object. This image is usually captured on a film which is subsequently developed and fixed in film processing machines employing various chemicals. The present invention is very sensitive to electromagnetic radiation and can be employed with substantially less incident radiation (approximately 25%) of the radiation normally required to produce a radiograph. A film coated with the present invention and exposed to X-rays produces a color image without the need to capture the image and convert it to color through intermediate means such as a computer. Using the present invention, a health care professional, for example, could easily obtain a color image of a damaged limb following exposure of the limb to X-rays. This color image could be obtained using only about 25% of the incident radiation normally required to produce a radiograph, thereby significantly decreasing direct and reflected radiation exposure to the patient and the health care professional. Reduced radiation levels also decrease the amount of lead shielding required, thereby reducing the weight of shielding screens and garments, and decreasing associated occupational injuries such as low back strain due to the necessity of wearing heavy lead aprons. Furthermore, this color image could be viewed soon after exposure to the X-rays, thereby decreasing time delays in processing films, reducing costs involved with the purchase of radiographic print development equipment and supplies, and reducing the cost of disposal of toxic chemicals associated with radiographic development.

The coated film of the present invention is also useful in the imaging of fluorographic procedures. Various fluorographic procedures, such as mannofluorography, involve the continuous exposure of the patient to X-ray radiation, and produce a black and white image of the differential radiodensity of the patient. These images are often stored on a tape and viewed as a continuous image. In this procedure, a radiocontrast material, such as barium, is observed as it moves within the subject. For example, after swallowing a bolus of barium, a health care professional may watch the barium travel from the mouth into the oropharynx, esophagus and stomach. Use of the present invention would provide an on-line color image of the patient while significantly reducing the radiation exposure of both the patient and the health care professional since substantially less incident radiation is required. The present invention is useful in a variety of similar radiologic procedures including, but not limited to the following; upper and lower gastrointestinal series, arteriograms, pneumograms, intravenous pyelograms, lymphangiography, choleangiography, myelograms, and other procedures. The present invention is also useful in the fields of nuclear medicine and radiation oncology where preparation and use of radiation in the form of medicine, or focused application of radiation for therapeutic reasons is common.

The use of the present invention in other imaging procedures is also considered within the scope of the present invention. These imaging procedures include any procedure wherein some form of electromagnetic radiation is applied to a patient, including but not limited to the following procedures, magnetic resonance imaging (MRI), computer assisted tomography (CRT or CAT), positron emission tomography (PET), and improvements thereof.

In addition to patients and other living animals and plants, other objects receiving radiation exposure may be inanimate. At this time, security measures in airports include radiographic analysis of luggage, coats, bags, etc. Use of the films of the present invention incorporating wavelength shifters would substantially decrease the level of required incident radiation to approximately 25% of current levels thereby providing reduced radiotoxicity and decreasing shielding costs, while also providing on-line color images which might facilitate identification of suspicious articles.

The present invention may be applied to improvements in radiation surveillance equipment. For example, radiation badges are worn by many individuals, especially research professionals, health care professionals and those individuals involved in nuclear facilities or in industries involving the use of radiation. These badges must be developed to provide a post facto assessment of the degree of radiation exposure of an individual. Use of the wavelength shifting additives of the present invention incorporated in a film badge would provide an immediate visible color indication of the extent of radiation exposure without the need for badge development using conventional means such as chemical developers and fixers. This capability is especially useful during procedures involving relatively high levels of radiation such as radioiodinations, or preparation of radioactive therapeutic formulations. Film badges incorporating the films of the present invention could be worn at any location desired for radiation surveillance, such as on the fingers, belt and lapel.

The films of the present invention could also be incorporated into suits for astronauts and for employees in the aeronautics, aerospace and nuclear industries who are exposed to high levels of radiation. The films of the present invention could also be incorporated into the cockpits and windshields of airplanes which are exposed to high levels of radiation in the upper levels of the atmosphere. These films of the present invention may be incorporated into badges or into the clothing of employees in the aviation industry such as pilots, flight engineers, stewards and stewardesses who are exposed to increased levels of radiation during flight. Other industrial employees would benefit from the present invention including, but not limited to, those exposed to higher levels of solar radiation in industries such as construction, transportation, agriculture, shipping, petroleum, and recreation.

The films of the present invention may be incorporated into recreational clothing and equipment, including, but not limited to visors, caps, sunglasses, swim suits, sports uniforms, umbrellas, blankets, towels and chairs so that individuals may accurately monitor their exposure to solar radiation, thereby decreasing the incidence of sunburns and various forms of skin cancer, especially melanoma, which have increased dramatically in recent years and are projected to increase further in the future.

Another item of radiation detection equipment that may incorporate the present invention involves small pieces of film attached to cotton swabs, filter paper, towelettes or wipes for use in radiation surveillance wipe tests performed to determine if a radioactive spill has occurred. The present invention would eliminate the need for measuring the radioactivity of conventional pieces of filter paper in a gamma counter since the papers with attached film that become radioactive or transmit radiation would instantly change color. The present invention would save time and money in unnecessary counting of wipe tests in gamma counters, thereby increasing availability of gamma counters for use in assays, and provide instant results. The film of the present invention could also be incorporated into sheets of laboratory bench-top paper so that radioactive spills could be visualized immediately during a procedure, such as a radioiodination, thereby alerting the individual to the danger so that corrective procedures may be initiated. The present invention is especially useful to research professionals and health care professionals.

The films of the present invention may also be used in the separations sciences. The film can provide a color print of radiolabelled bands on gel used for separating molecules including, but not limited to proteins, nucleoproteins, and nucleic acids, thereby indicating the location of various radiolabelled molecules and obviating the need for apposition of conventional photographic films and their development. The film may be used to monitor the passage of radiolabelled materials through chromatographic columns. This film may also provide a color print of bands on gels that contain ethidium bromide or other markers that are activated by electromagnetic radiation, such as ultraviolet radiation, and emit electromagnetic radiation in the form of ultraviolet radiation. The sensitive films of the present invention permit the use of significantly lower amounts of toxic dyes such as ethidium bromide that are required to visualize bands upon UV exposure.

The present invention may also be incorporated in detection systems that measure radiation output, such as gamma counters, scintillation counters, and spectrophotometers.

The films of the present invention can also be used in applications involving imaging of radiation based phenomena such as radiation emitted from stars, nuclear facilities, nuclear storage facilities, nuclear test sites, from shipment canisters and containers for radionuclides. For example, incorporation of the film of the present invention into the canisters used to ship radionuclides might warn the user of the isotope before opening the canister and risking exposure to concentrated doses of radioactivity if there has been contamination of the canister. This application eliminates the need for time consuming radioactive surveillance "wipe tests".

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing MEfrom the spirit of the present invention and/or the scope of the appended claims. Unless otherwise indicated, all chemicals are obtained from Aldrich Chemical Company, Milwaukee, Wis.

EXAMPLE 1

Method of Making Polymer Optical Fiber

About 50 g of styrene (100% distilled) is added to about 50 g methylmethacrylate (100% distilled). Next the following reagents are added in any order to the styrene: methylmethacrylate mixture: dibenzoyl peroxide (1 to 2% weight (wt)%); dodecylmercaptan (1% wt % of a 100% distilled stock); and butyl thiophene (0.5% wt % of a 100% distilled stock). The mixture is heated in the following manner: first to 100° C. for about 3 hours (hr), followed by 120° C. for about 3 hr; 150° C. for about 2 hr and finally at 85° C. for about 12 hr. In this and subsequent examples, the mixture is heated under nitrogen atmosphere in a vacuum oven without the application of a vacuum.

EXAMPLE 2

Method of Making Polymer Optical Fiber

About 50 g of styrene (100% distilled) is added to 50 g methylmethacrylate (100% distilled). Next, the following reagents are added in any order to the styrene: methylmethacrylate mixture: dibenzoyl peroxide (1 to 2% wt %); dodecylmercaptan 1% wt % of a 100% distilled stock); and butyl thiophene (0.5% (wt %) of a 100% distilled stock).

Next add N,N-dimethylaniline (1% wt %) of a distilled stock) and 1.0% (wt %) tetrabutyl ammonium fluoride tetrahydrate (TAFT) which is at 10% (wt %) in methanol. It is believed that the N,N-dimethylaniline and TAFT speed polymerization and increase the molecular weights of the resulting polymers in the fibers.

The mixture is heated in the following manner: first to 100° C. for about 3 hr, followed by 120° C. for about 3 hr; 150° C. for about 2 hr and finally at 85° C. for about 12 hr. Polymerization occurs in about 10 hr and the molecular weights of the resulting polymers are higher than in Example 1.

EXAMPLE 3

Method of Rapidly Making Flexible Polymer Optical Fiber

The same procedure is used as in Example 2 except that the 1.0% (wt %) TAFT which is added to 25 g of styrene and 75 g of methylmethacrylate is in 10% (wt %) methylmethacrylate. N,N-dimethylaniline (1% (wt %) of a distilled stock) is added. The heating conditions are the same as recited in Example 2.

The resulting fibers show increased flexibility, contain higher molecular weight polymers and are formed more rapidly than the fibers formed by the process of Example 1.

EXAMPLE 4

Method of Rapidly Making Flexible Polymer Optical Fiber

The same materials are used as in Example 3 except that N,N-dimethylaniline is not employed. Mercuric-2-chloride (0.5–1.0% (wt %)) in a solution of methanol (10% wt %) is added and the mixture is heated at 100° C. for 30 minutes. The mixture is then allowed to cool. After 20 minutes, the procedure may be stopped at room temperature. At this time, the material is in the form of a viscous semi-polymer and it may be drawn continuously to polymerize. Nitrogen gas pressure may be used to push the viscous material out of the vessel into the desired shape, although any extrusion apparatus may be used to push the material out of the reaction vessel. The resulting fibers do not discolor, are flexible and draw into fibers very easily. The process described in this Example provides a rapid rate of polymerization and the capability to make higher molecular weight polymers.

It is also possible to use mercurate chloride and mercuric oxide instead of mercuric-2-chloride in the method described in this Example.

EXAMPLE 5

Graded Index Fiber

About 50 g of styrene (100% distilled) is added to 50 g methylmethacrylate (100% distilled). Next the following reagents are added in any order to the styrene: methylmethacrylate mixture: dibenzoyl peroxide (10% wt %); dodecylmercaptan (1% wt % of a 100% distilled stock); and butyl thiophene (0.5% wt % of a 100% distilled stock). The amount of styrene that is added is varied depending on the desired refractive index. Next, 2,2,2-trifluoroethyl methacrylate (1–20% wt %) or 2,2,2-trifluoroethyl acrylate (1–20% wt %) is added and mixed with the other reagents. The mixture is then placed in a vacuum oven under nitrogen atmosphere at 50° C. for 2 hr. No vacuum is applied to the vacuum oven. The wt % of 2,2,2-trifluoroethyl methacrylate or 2,2,2-trifluoroethyl acrylate which is added may vary between (1–20% wt %) depending on the desired profile of refractive index of the fiber. In the present example, 10% (wt %) 2,2,2-trifluoroethyl methacrylate was used. Next the temperature is gradually increased depending on the percentage of polymer desired and the profile of the desired refractive index. The rate of temperature increase is approximately 10° C. per 30 minutes until 100° C. is attained. The rate of temperature increase may be altered to affect the graded index characteristics of the fiber. Then the temperature is increased to 130° C. for 1 hr and the procedure is finished.

EXAMPLE 6

Wavelength Shifting Composition for Wavelength Shifts from 250 nm to 420 nm

A wavelength shifting composition is prepared by the following protocol. Five g of piperonal and 5 g of cyanoacetate are mixed with 0.8 ml of piperidine. The mixture is then dissolved in 100 ml of toluene. Five g of molecular sieves (Aldrich) is added to the solution. The mixture is heated at 70° C. for 6 hr. The mixture is then filtered through filter paper to remove the molecular sieve. The mixture is then cooled and the toluene is removed by evaporation to yield a powder. The powder can be dissolved in benzene at a concentration of 1 g/ml. The concentration of powder in the benzene can vary depending upon the amount of wavelength shifter needed in the final polymer matrix.

Various amounts of the benzene solution are added to a conventional methyl methacrylate prepolymer and the solution is polymerized according to conventional reaction protocols well known to those of ordinary skill in the art. (See, for example, "Polymer Synthesis", Sandler et al., Vol. 1, pp. 5–12, second edition, Academic Press, 1992) The amount of benzene solution can vary depending upon the fluorescence amplitudes needed. The resulting polymer is drawn into fiber by conventional means. The resulting polymer fiber is capable of shifting the wavelength of the electromagnetic radiation from approximately 250 nm to 420 nm.

EXAMPLE 7

Wavelength Shifting Composition for Wavelength Shifts from 250 nm to 400 nm

A wavelength shifting composition which has a more narrow wavelength shift is prepared according to the protocol in Example 6 except that 7 g of piperonal was used in the starting step. The resulting polymer fiber is capable of shifting the wavelength of the electromagnetic radiation from about 250 nm to 400 nm.

EXAMPLE 8

Wavelength Shifting Composition for Wavelength Shifting from Ultraviolet Electromagnetic Radiation to Visible Radiation A second wavelength shifting composition capable of shifting ultraviolet electromagnetic radiation to visible radiation is prepared by the following protocol. 0.5 g of 4-4'-methoxy biphenyl piperidine-N-oxide is dissolved in 40 ml of tetrahydrofuran (THF). 0.25 μL of 2.1 mM ethyl chloroformate is stirred vigorously into the solution at 20° C. for 20 minutes. After the polymerization step, the solution is cooled to −50° C. Nineteen ml of a 2.28 mM (in THF) anisyl magnesium bromide solution is added to above. The solution is maintained at −50° C. and stirred for 5 minutes and then is cooled to −70° C. for 30 minutes. The solution is then warmed gradually to 20° C. The solution is titrated slowly with 5 ml of methanol. The resulting mixture is filtered and the retained yellow powder is dried by evaporation.

A solution is prepared by dissolving 10 g of methoxymethyl p-tolyl ether in 20 ml of THF. The solution is cooled to −60° C. About 2.8 to 3.0 ml of 2 mM n-butyllithium in hexane is added to the solution and mixed for 30 minutes. The solution is gradually warmed to room temperature and is purged with nitrogen. 1.3 g of $MgBr_2$ is added to the solution and stirred for 0.5 hr. Then 190 mg of the yellow powder is added to the methoxymethyl p-tolyl ether solution and is heated to 25° C. for 2 hr. This solution is then added to conventional fiber optic polymers and fiber optic cable is prepared. The resulting fiber optic cable is capable of shifting the wavelength of ultraviolet radiation to visible radiation.

EXAMPLE 9

Wavelength Shifting Composition for Wavelength Shifts from 250 nm to 400 nm Incorporated into a Plastic Sheet An additive that can be added to polymethylmethacrylate sheets, films or gels is prepared by mixing 20 ml of distilled 3-bromomethyl thiophene with 5 g of methoxy ethanol ethoxide. To this mixture 1 g CuO in 5 ml of 10% KI in ethanol is added. The solution is stirred at 110° C. for 3 hr. The resulting solution is filtered and dried under vacuum. The resulting powder is then added to conventional methylmethacrylate and initiators to produce a plastic sheet with a thickness of 100 μm to 2 mm. The plastic sheet is capable of shifting a wavelength from 250 nm to 400 nm.

EXAMPLE 10

Add 1 mole of OH-terminated biphenol polycarbonate to 1.05–2 moles of Cl-terminated siloxane in THF with different tertiary amines. It also can be polymerized by adding the latter to OH-terminated polycarbonates with alkoxy-function siloxanes with alcoholic splitting.

Other reagents can be used by replacing pyridine in the initial reaction of the halide-terminated organosiloxane (bromine, and fluorine-terminated organosiloxanes may also be used) and dihydric phenol with readily and completely removable ammonia.

To increase flexibility (for a rubber-like fiber optics guide), polymerize as before diphenylolpropane bis-chlorobromate with Cl-terminated organosiloxane.

EXAMPLE 11

Method of Making a Composition for Wavelength Shifts of 200 nm to 700 nm.

Add 1.0 g (2.59 mmoles) dialdehyde and 1.82 g (2.6 mmoles) phosphorus pentasulfide to 25 ml of 0.5 g LiCl in dimethyl formamide (DMF). Using a syringe, add dropwise 15 ml of a 1 M potassium tert-butoxide solution in THF. After 6 hr of stirring, add 25 ml of 5% aqueous HCl; dry under reduced pressure. Dissolve the dried powder in chloroform and wash twice in 2% HCl and then 4 times in pure water and dry in a desiccator and then precipitate in absolute ethanol.

While not wanting to be bound by the following statement, it is believed that this copolymer changes the linkage links. The side chain position can be changed by varying the amount of the dialdehyde and by adding small amounts of terephthalaldehydes to the first solution.

EXAMPLE 12

Method and Apparatus for Producing Graded Index Optical Fiber

The method of producing the graded index optical fiber cable includes beginning with a cylinder of a homogeneous cladding that is comprised of a suitable copolymer. The cladding is then inserted into a tube chamber with a volume of 200 ml. The chamber is capable of being heated and rotated along its longitudinal axis. (See FIG. 1) For example, the cladding can be α,ω, dichloropropyl-dimethylsiloxane which has a refractive index of approximately 1.42.

EXAMPLE 13

A monomer mixture of dimethylsiloxane and bis phenyl A polycarbonate with bisphenyl A pyridine methylene chloride and phosgene gas (carbonic dichloride) is then continuously added to the interior of the cladding as the chamber is heated and rotated. The polymers are added at a rate of approximately 5 ml/second. The phosgene gas is added continuously at a rate of approximately 1 ml/second. During the addition of the reactants, the chamber is heated to a temperature of approximately 100° C. The chamber is rotated at a rate of approximately 12 to 30 revolutions per minute.

The reactants can be added through the side of the tube or preferably through the end of the tube through a membrane such as a Teflon membrane. (See FIG. 3) As the copolymer polymerizes on the inner surface of the cladding the ratio of bis phenyl A polycarbonate to dimethylsiloxane can be varied to provide a copolymer with gradually changing refractive index.

As the copolymer builds up on the inner surface of the cladding, the amount of polydimethylsiloxane decreases and the amount of bis phenyl A polycarbonate increases until the preform rod is filled in. The process of administering the copolymer is adjusted so that the final polymer administered is bis phenyl A polycarbonate which has a refractive index of 1.58. The resulting preform rod is a graded index rod with an index of 1.42 on the surface which gradually increases to 1.58 at the center of the preform rod. The rod can then be heat-drawn using conventional extrusion techniques to provide a graded index polymer optical fiber.

EXAMPLE 14

Method and Composition for Increasing Clarity of Graded Index Optical Fiber

The clarity of the graded index optical fiber prepared according to Examples 12 and 13 is increased by the addition of the free radical scavengers dibutyl-1-phthalate at a concentration of approximately 0.5% by volume to the premix before injection into the reaction chamber.

The resulting fibers can easily be bundled together and fused by placing the bundle in a container and applying a vacuum to the bundle. The temperature is then raised to the glass transition point of the cladding. The bundle is then allowed to cool. The process is desirably repeated four to five times resulting in a uniform bundle of fibers.

EXAMPLE 15

Method and Composition for Wavelength Shifts from Ultraviolet Radiation to Blue-green Radiation This example provides a composition in the form of a solution which provides the capability for polymeric optical fibers as well as polymeric sheets and other objects made from the polymers of the present invention to shift the wavelengths of ultraviolet radiation, for example from wavelengths at about 220 nm, to wavelengths in the blue-green visible range from about 300 to 500 nm. For example, the composition of this Example may be added to the compositions of Example 9.

Solution 1 is made by mixing from about 0.9 g to 1.1 g of quinoline, about 9 to 11 ml of 1N sulfuric acid ($H_2SO_4$) and about 5.5 to 6.5 ml of N-methylpyrrolidinone(NMP- 100% distilled). Solution 2 is made by mixing about 0.9 g to 1.1 g of pyridine-NO, about 9 to 11 ml methanol, and about 4.5 to 5.5 ml of 1M potassium hydroxide. Solution 3 is made by mixing about 9 to 11 ml of solution 2 and about 5.5 to 6.5 ml of 1 N hydrochloric acid (HCl). Solution 4 is made by mixing all of solution 3 and about 0.3 to 0.4 ml of polyaniline dissolved in NMP. Solution 5 is made by mixing about 0.9 to 1.1 ml of solution 4 and about 9 to 11 ml of solution 1. Solution 6 is made by mixing about 2.7 to 3.3 ml of anisyl magnesium bromide with the entire volume of Solution 5. Solution 7 is made by mixing about 4.5 to 5.5 ml of solution 1 with about 4.5 to 5.5 ml of solution 6. Solution 8 is made by heating solution 7 at approximately 45–55° C. for about 13 to 17 minutes.

Solution 8 converts ultraviolet radiation into blue-green visible radiation with greater than 95% efficiency.

The anisyl magnesium bromide was made using 4-bromoanisole and magnesium in the following manner. About 25 ml of tetrahydrofuran (THF) was combined with 12 ml of 4-bromoanisole, and purged with nitrogen gas while stirring before addition of 4.8 g of magnesium powder. The mixture was stirred for about 30 min, 100 ml of THF was added and the mixture stirred for about an hour. The THF was decanted, the precipitate washed in acetone, filtered under vacuum, and washed again with acetone.

EXAMPLE 16

Method and Composition for Wavelength Shifts to Blue Radiation

About 5 to 30 mg of quinine or quinine monohydrochloride dihydrate were dissolved in approximately 9 to 11 ml of methanol (dry and distilled). To this mixture about 0.1 to 1.0 ml of 1M $H_2SO_4$ was added and stirred at high speed for about 55 to 65 minutes. Various amounts of the mixture were added to the methylmethacrylate/styrene solution and polymerized as in Example 1 and 2 above. The resulting boules displayed high efficiency fluorescence in the blue wavelengths from about 340 nm to 460 nm.

EXAMPLE 17

A graded index polymer optical fiber is prepared by mixing methylmethacrylate and polymethylmethacrylate (approximately 75,000 Daltons from Aldrich) in a ratio of 90% to 10% by weight. About 70 g of methylmethacrylate/polymethylmethacrylate is mixed with about 14 g of bromobenzene. This solution is mixed thoroughly and then approximately 0.03 g of 2,2'-azobisisobutyronitrile (AIBN) and about 5 ml of 2,2,2-trifluoroethylacrylate is added and mixed in a beaker. The solution is then exposed to microwave radiation (700 watts) for 30 seconds and then the solution is cooled in a ice bath. The exposure to microwave radiation and the cooling in an ice bath is repeated until a thick gel is formed. After the gel is formed, about 250 µl of a mixture of butanethiol in methylmethacrylate (250 µl to 5 ml) is added to the gel. The butanethiol is added at a concentration of between approximately 0.01 to 0.5% by weight. The resulting gel is then cured in an oven at about 80° C. for about 24 hours and then about 100° C. for about 12 hours or more.

EXAMPLE 18

Methylmethacrylate is treated in concentrated $H_2S_{O4}$ for approximately 1 hour and then distilled under nitrogen into a beaker which contains about 14 g of bromobenzene. To this solution is added approximately 0.03 g of AIBN and about 5 ml of 2,2,2-trifluoroethyl acrylate is added and mixed in a beaker. The solution is then exposed to microwave radiation (700 watts) for about 30 seconds and then the solution is cooled in a ice bath. The exposure to microwave radiation and the cooling in an ice bath is repeated until a thick gel is formed. After the gel is formed, about 250 µl of a mixture of butanethiol in methylmethacrylate (250 µl to 5 ml) is added to the gel. The butanethiol is added at a concentration of between approximately 0.01 to 0.5% by weight. The resulting gel is then cured in an oven at about 80° C. for approximately 24 hours and then about 100° C. for about 12 hours or more.

EXAMPLE 19

About 59.65 mole % of methylmethacrylate is added to about 40 mole % of ethylacrylate. To this mixture is added approximately 0.03 mole % of butyl thiophene, 0.005 mole % of dodecylmercaptan (100% distilled stock), and 0.05 mole % of the initiator AIBN. Other initiators such as benzyl peroxide, tertiary butyl peroxide and dibenzoyl peroxide can be used. The solution was then exposed to microwave radiation (700 watts) for about 2 minutes and was then allowed to cool in an ice bath. The solution is then exposed to microwave radiation for about 30 seconds and then cooled in a ice bath. This procedure is repeated several times until a thick gel is formed. The gel is then cured at approximately 55° C. for 24 hours. The heat is then raised to approximately 80° C. for 36 additional hours. The resulting preform has remarkable clarity.

EXAMPLE 20

About 5% by weight of a 1,000,000 Mw polymethylmethacrylate from Aldrich was dissolved in methylmethacrylate. The solution was then gelled in a home microwave oven (700 watts) by repeated exposures for about 30 seconds and cooling in an ice bath between exposures. To the gel, about 1 to 20% by weight of bromobenzene and about 0.01 to 0.05% by weight of butanethiol was added as a chain transfer agent. Ethyl acrylate can then be optionally added at a concentration of between approximately 0% and 10% by weight. The gel is cured in an oven at approximately 70° C. to 80° C. for 24 hours and then for 12 additional hours at 90° C. to 110° C. to produce high transmission boules.

EXAMPLE 21

The microwave treated gel from Example 20 is poured into a polymethylmethacrylate tube and then cured in an oven at between approximately 70° C. to 80° C. for 12 to 24 hours. Alternatively, the gel is added to the chamber as described in Example 13, and cured at a temperature of between about 90° C. and 110° C. for approximately 12 hours. This produces a graded index preform rod.

EXAMPLE 22

To about 90 grams of styrene add 5 grams of trioxane dissolved in chloroform, $CH_2Cl_2$. Next add 0.2 percent by weight of boron trifluoride etherate, $BF_3O(Eth)_2$, and distill. To this distilled monomer add 190 microliters butanethiol of a 100% distilled stock and 0.01 g benzoyl peroxide of a 100% distilled stock. The mixture is then placed into a mold of a desired inside diameter and length. The mold may be made from various materials including, but not limited to glass, silicone, stainless steel, and polymers. The filled mold is purged with nitrogen gas and sealed.

Sealed molds containing the monomer mixture are then lowered into a liquid bath designed for continuous flow. The liquid bath may comprise silicon oil, castor oil, or ethylene glycol. The bath is sealed and heated in the following manner: first to 80° C. for 5 hours, followed by 90° C. for 8 hours, 105° C. for 9 hours, 110° C. for 6 hours, and finally 120° C. for 2 hours. Polymerization occurs in about 15 hours. The resulting cast core preform is removed from the mold and heated under vacuum to 100° C. for 48 hours to remove any residual moisture and prepared for insertion or fusion into a cladding tube to create a step-index, multi-mode optical fiber. The resulting optical fiber is capable of transmission of less than 50 dB/km at 650 nm. The optical fiber exhibits enhanced optical and mechanical attributes.

EXAMPLE 23

To about 200g of methylmethacrylate (100% distilled) is added 20g of diphenyl sulfide, 0.05% by weight butanethiol of a 100% distilled stock, 0.005% by weight dodecathiol of a 100% distilled stock, and 0.08 g benzoyl peroxide of a 100% distilled stock. The mixture is then cast into a mold with a predetermined inside diameter and length and purged with nitrogen gas and then sealed.

The sealed molds containing the mixture are then lowered into a liquid bath designed for continuous flow. The bath is then sealed and heated in the following manner: first to 80° C. for 5 hours, followed by 90° C. for 8 hours, 105 degrees C for 9 hours, 110° C. for 6 hours, and finally 120° C. for 2 hours. Polymerization occurs in 15 hours. The cast core preform is removed from the mold and heated under vacuum to 100° C. for 48 hours to remove any residual moisture and prepared for insertion or fusion into a cladding tube to create a step-index, multi-mode optical fiber. The resulting fiber is capable of transmission of less than 250 dB/km at 650 nm, and exhibits enhanced optical and mechanical attributes.

EXAMPLE 24

To about 200 g of methylmethacrylate (100% distilled) is added 2% by weight phenyl sulfide of a 100% distilled stock, 400 microliters butanethiol of a 100% distilled stock, and 0.01 g benzoyl peroxide of a 100% distilled stock. The mixture is then cast into a mold with a predetermined inside diameter and length, purged with nitrogen gas and then sealed.

The sealed molds containing the mixture are then lowered into a liquid bath designed for continuous flow. The bath is then sealed and heated in the following manner: first to 80° C. for 5 hours, followed by 90° C. for 8 hours, 105° C. for 9 hours, 100° C. for 6 hours, and finally 120° C. for 2 hours. Polymerization occurs in 15 hours. The cast core preform is removed from the mold and heated under vacuum to 100° C. for 48 hours to remove any residual moisture and prepared insertion or fusion into a cladding tube to create a step-index multi-mode optical fiber. The resulting fiber is capable of transmission of less than 150 dB/km at 650 nm, and exhibits enhanced optical and mechanical attributes.

EXAMPLE 25

Method of Making Cladding for use with Cast Preforn Cores

The cladding in the above three examples is a low refractive index material that surrounds the core to contain the core light/signal while protecting against surface contaminant scattering. The cladding also may serve as a coating. To 25 kg of polyvinylidine fluoride add about 15–18% hexafluoropropylene. Copolymerize and cast, fuse, pultrude or extrude into tubing to of desired diameter, length and thickness. The resulting numerical aperture will be approximately 0.50. To increase or lower numerical aperture, blend with a given percentage of polymers with different index of refraction, such as, but not limited to polymethylmethacrylate for decreasing numerical aperture, or a perfluorinated polymer for increased numerical aperture. The resultant numerical apertures will range from 0.27 to 1.0.

It should be understood, of course, that the foregoing relates only to preferred embodiments of the present invention and that numerous modifications or alterations may be made therein without departing from the spirit and the scope of the invention.

What is claimed is:

1. A method of preparing a step index preform rod comprising:
   causing a controlled polymerization of a preform rod comprising a monomer, butanethiol, and an initiator at a sequence of temperatures having at least three distinct steps in a range from about 80° C. to about 140° C., wherein the monomer is styrene or methyl methacrylate; and
   cladding or coating tihe preform rod with a lowe refractive index material.

2. The method of claim 1, wherein butanethiol comprises from about 0.0001 to about 0.1 weight percent of the preform rod.

3. The method of claim 1, wherein the initiator comprises benzoyl peroxide.

4. The method of claim 1, wherein the lower refractive index material comprises a perfluorinated polymer.

5. The method of claim 1, wherein the lower refractive index material comprises polyvinylidene fluoride.

6. The method of claim 1, wherein the lower refractive index material comprises poly(methyl methacrylate).

7. A method of preparing a step index preform rod comprising:
   causing a controlled polymerization of a preform rod from a prepolymer mixture comprising at least 0.001 weight percent butanethiol, an initiator, and a monomer selected from styrene or methyl methacrylate at a sequence of temperatures having at least three distinct steps in a range frm about 80° C. to about 140° C.; and
   cladding or coating the preform rod with a lower refractive index material.

8. The method of claim 7, wherein the lower refractive index material comprises a copolymer of polyvinylidene fluoride and hexafluoropropylene.

9. The method of claim 1, wherein the lower refractive index material is formed from a mixture of polyvinylidene fluoride and hexafluoropropylene.

10. The method of claim 1, wherein the lower refractive index material comprises a blend of materials containing poly(methyl methacrylate).

11. The method of claim 1, wherein the sequence of temperatures is in a range from about 80° C. to about 120° C.

12. The method of claim 1, wherein the step of causing a controlled polymerization of the preform rod comprises controlling temperature change during polymerization of the preform rod.

13. The method of claim 1, wherein the step of causing a controlled polymerization of the preform rod comprises controlling changes in and durations of the temperatures in the sequence of temperatures employed during polymerization of the preform rod.

14. The method of claim 1, wherein the sequence of temperatures comprises:
   about 80° C. for a first period;
   about 90° C. for a second period;
   about 105° C. for a third period;
   between about 100° C. and about 110° C. for a fourth period; and
   about 120° C. for a fifth period.

15. A method of forming a step index fiber comprising extruding the step index preform rod of claim 1.

16. The method of claim 7, wherein the prepolymer mixture further comprises boron trifluoride etherate.

17. The method of claim 7, wherein the prepolymer mixture further comprises trioxane.

18. The method of claim 7, wherein the prepolymer mixture further comprises trioxane, and boron trifluoride etherate.

19. The method of claim 7, wherein the sequence of temperatures is in a range from about 80° C. to about 120° C.

20. A method of preparing a step index optical fiber comprising extruding the step index preform rod of claim 7.

21. A method of preparing a step index preform rod comprising:
   causing a controlled polymerization of a preform rod comprising butanethiol, an initiator, ad a monomer selected from styrene or methyl methacrylate at a sequence of temperatures having at least three distinct steps in a range from about 80° C. to about 120° C.; and
   cladding or coating the preform rod with a lower refractive index material comprising a copolymer of polyvinylidene fluoride and hexafluoropropylene.

22. The method of claim 21, wherein the initiator comprises benzoyl peroxide.

23. A method of forming a step index optical fiber comprising extruding the step index perform rod of claim 21.

24. A method of preparing a stop index optical fiber comprising:
   causing a controlled polymerization of a preform rod from a prepolymer mixture comprising butanethiol, an initator, and a monomer selected from styrene or methyl metacrylate at a sequence of temperatures having at least three distinct steps in a range from about 80° C. to about 140° C.;
   cladding or coating the preform rod with a lower refractive index material to form a step index preform rod; and
   extuding the step index perform rod to form the step index optical fiber, wherein the step index optical fiber has an optical attenuation of less than about 250 dB/km at 650 nm.

25. The method of claim 24, wherein the step index optical fiber has an optical attenuation of less than 150 dB/km at 650 nm.

26. The method of claim 24, wherein the step index optical fiber has an optical attenuation of less than 50 dB/km at 650 nm.

27. The method of claim 24, wherein the prepolymer mixture further comprises diphenyl sulfide.

28. The method of claim 24, wherein the prepolymer mixture further comprises diphenyl sulfide and dodecathiol.

29. The method of claim 24, wherein the prepolymer mixture further comprises trioxane and boron trifluoride etherate.

30. The method of claim 24, wherein the temperature conditions are in a range from about 80° C. to about 120° C.

* * * * *